March 25, 1930.   R. I. McCARTY   1,751,870
BRICK MACHINE
Filed Sept. 11, 1928   3 Sheets-Sheet 2

WITNESS:
Robt R Kitchel.

INVENTOR
Roy I. McCarty
BY
Augustus B. Stoughton
ATTORNEY.

March 25, 1930.  R. I. McCARTY  1,751,870
BRICK MACHINE
Filed Sept. 11, 1928  3 Sheets-Sheet 3

WITNESS:
Rob R Kitchel

INVENTOR
Roy I. McCarty
BY
Augustus B Stoughton
ATTORNEY.

Patented Mar. 25, 1930

1,751,870

UNITED STATES PATENT OFFICE

ROY I. McCARTY, OF BARREE, PENNSYLVANIA

BRICK MACHINE

Application filed September 11, 1928. Serial No. 305,174.

The principal object of the present invention is to provide an off-bearing machine for making silica and other brick rapidly, satisfactorily, automatically and by power.

Another object of the invention is to provide such a machine in which the useful life of the molds will be greatly increased in comparison with molds heretofore employed for making bricks by hand.

Other objects of the invention will appear from the following description at the end of which the invention will be claimed but, generally stated, the invention comprises a brick machine including a generally rectangular mold carrier revoluble about a horizontal axis and having mold frames on opposite faces thereof, a plunger head arranged in the carrier and reciprocatable with respect to the carrier and having mold bottoms for said frames, means for intermittently rotating the carrier to present one set of frames at the top for the reception of brick material and one set of frames at the bottom for the delivery of bricks, a slicker at the top operative across the frames, and pallet carriers adapted to apply pallets to the filled molds as they are turning from top to bottom and to receive bricks as they are ejected from the molds in lowest position by the movement of the plunger head and mold bottoms.

The invention also comprises the improvements to be presently described and finally claimed.

In the following description reference will be made to the accompanying drawings forming part hereof and in which Figure 1 is a diagrammatic and schematic view, principally in elevation, with parts removed, illustrative of features of the invention.

Figure 2:
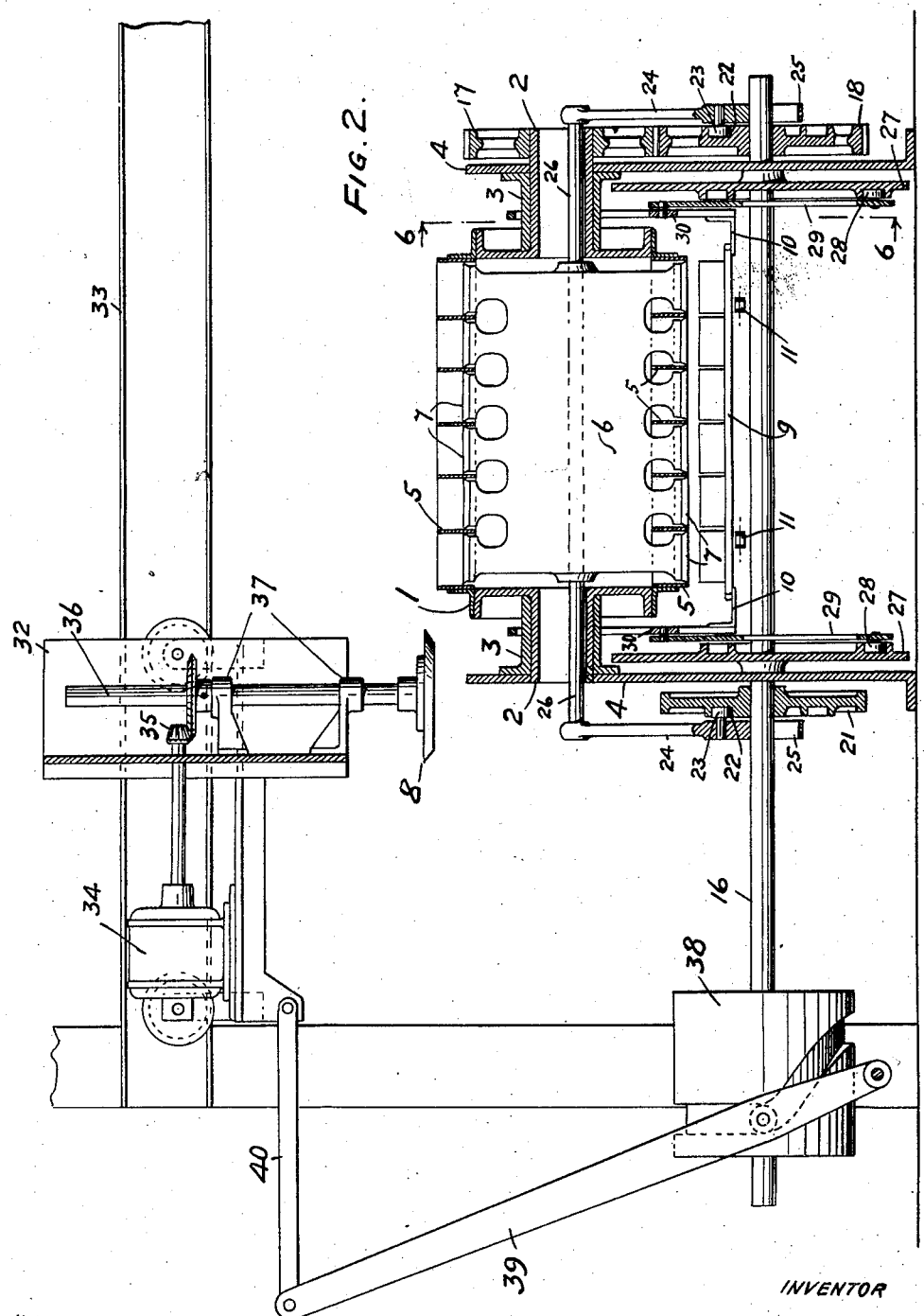
Fig. 2 is a longitudinal sectional view illustrating a machine embodying features of the invention.

Referring to the drawings, 1 is a hollow generally rectangular mold carrier and it is mounted for revolution about a horizontal axis. As shown its ends are provided with hollow trunnions 2 turnable in bearings 3 carried by end frames 4. The mold carrier is provided on opposite faces with mold frames 5 providing open bottomed mold cavities. Within the interior of the mold carrier is movably arranged a plunger head 6 provided with mold bottoms 7 for the mold frames. When the mold carrier 1 is in vertical position and is about to receive the material for making bricks, as will be hereinafter described, the center lines of the carrier and plunger do not coincide leaving the mold bottoms 7 at the top sufficiently below the top of the carrier to provide for the thickness of a brick. After the carrier 1 has been inverted the center line of the plunger is dropped by means hereinafter described flush with the bottom edge of the frames as shown in Fig. 2.

Figure 1:
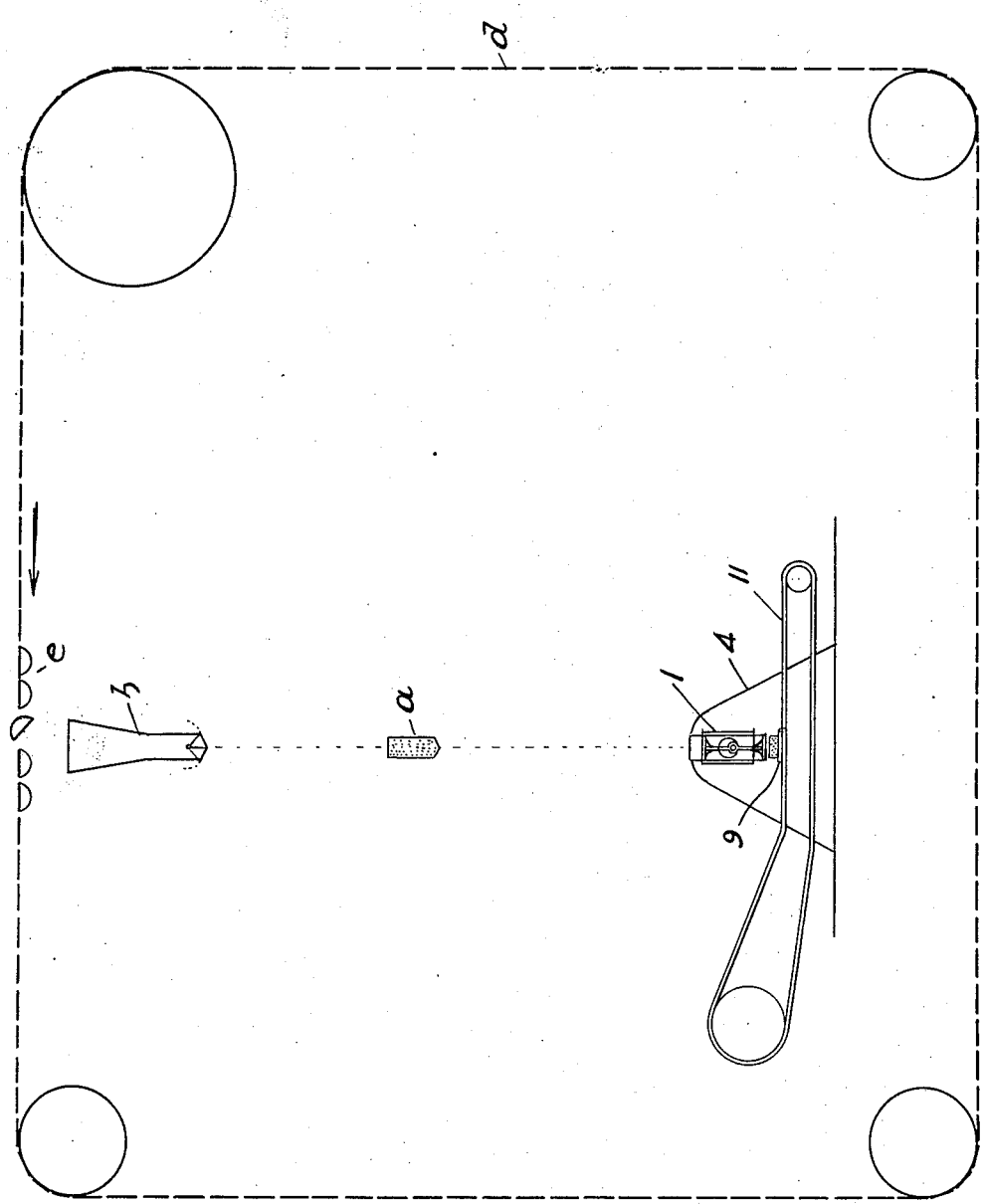

Thus there is provided at the top of the mold carrier mold cavities into which a supply of brick making material, indicated at $a$ in Fig. 1, can be dropped from an overhead hopper $b$ supplied with such material, for example, by the buckets of the bucket conveyor $d$ of which some are indicated at $e$. It will be understood that the mold carrier 1 is at rest at the time when its molds are supplied with brick making material. After the brick making material has been dropped into the molds at the top of the mold carrier the slicker 8, hereinafter more fully described, passes over the molds and removes surplus material, then the mold carrier 1 is given a half turn, for example, in clockwise direction with reference to Fig. 4, and at or near the first quarter turn a pallet is placed over the material in the molds so as to retain it by means of pallet carriers 10 and their actuating mechanism hereinafter more fully described. Upon completion of a half turn of the carrier 1, the plunger head is moved into the position shown in Fig. 2 with the result that its center line is dropped in respect to the center line of the mold carrier 1, thus ejecting the bricks from the mold and delivering them onto the pallet which by the pallet carriers is placed upon the conveyor 11. During the ejection of the bricks from the molds the carrier 1 is at rest. During the succeeding half turn of the mold carrier the plunger is returned to the position described with its center line substantially coincident with the center line of the mold carrier.

Figure 3:
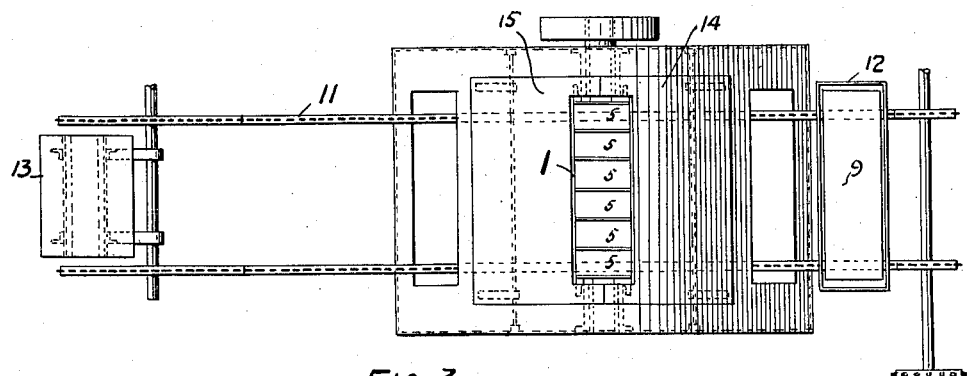
Fig. 3 is a top or plan view of the same drawn to a reduced scale.

There is a hopper 12 from the open bottom of which pallets 9 are taken one at a time by the conveyor 11 and delivered to the pallet carriers 10. The conveyor 11 is moved with a step by step movement. The pallets carrying the finished bricks are delivered to the table 13. A two part hood having an opening therein through which the mold cavities are accessible, Fig. 3, is provided, and the parts 14 and 15 of the hood may be movable into the position shown by dotted lines in Fig. 4, to permit of rotation of the mold carrier. The purpose of the hood is to act as a guard for material that may not enter the mold and for material that is removed by the slicker.

Having described certain parts of the machine and indicated their operation, a description will be given of means for actuating the parts. 16 is a driving shaft. Interposed between the shaft 16 and one of the trunnions 2 of the mold carrier are segmental toothed wheels 17 and 18 having provisions 19 and 20 and by which the mold carrier 1 is turned a half revolution and then held for an interval of time and then given another half revolution, the dwells in the revolutions occurring when the carrier is in vertical position. On the toothed wheel 18 and also on the wheel 21 there is provided a cam 22. In the groove of each cam 22 is arranged a follower 23 provided on a link 24 having a strap or loop 25 which rides on the shaft 16. The links 24 are turnably connected with pintles 26 connected with the plunger 6. The purpose of the described cam mechanism is to impart the up and down movements to the plunger that have been referred to and to prevent up and down movements of the plunger while the mold carrier is turning.

Figure 5:
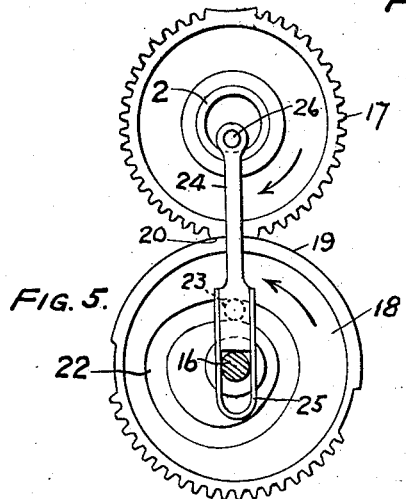
Fig. 5 is an end view, partly in section, of the mechanism for operating the plunger.

Referring to Fig. 5 and by way of further description, it may be said that as the trunnion 2 makes a half turn in clockwise direction, the link 24 holds the pintle 26 and guides it in such a way that it turns with the trunnion 2 and without relative motion between these elements until the pintle 26 is at the top, then and while the trunnion is at rest the pintle is dropped by the link 24 and connected parts into the position shown. Of course these operations are repeated.

Figure 6:
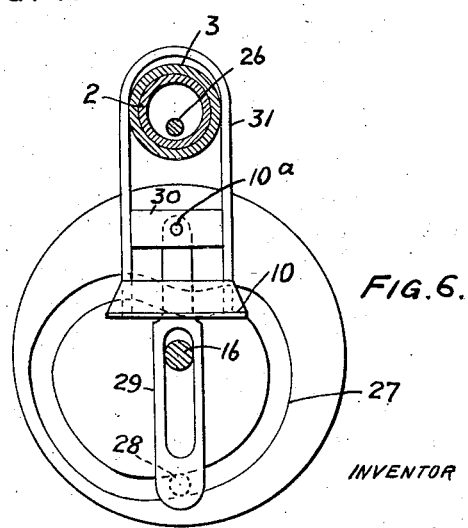
Fig. 6 is a sectional view taken on the line 6—6 of Fig. 2 showing the mechanism for moving the pellets.

Referring to Fig. 6 it may be said that the pallet carriers 10 are identical so that a description of one of them and its actuating mechanism will suffice. On the shaft 16 is a cam 27 which engages a follower 28 on a link 29 slotted for movement on the shaft 16, and the link 29 is pivoted at 10$^a$ to a bar 30 connected with the pallet carrier 10 and having a strap 31 that works on the bearing 3. The purpose of the mechanism last described is to cause the pallet carriers 10 to lift a pallet from the conveyor 11 and carry it upward to meet the oncoming filled molds and to cover them with a pallet so as to hold the bricks in them and to then travel in that position until the carrier comes to rest in vertical position when and upon discharge of the bricks the carrier returns the pallet along with the bricks to the conveyor.

Figure 4:
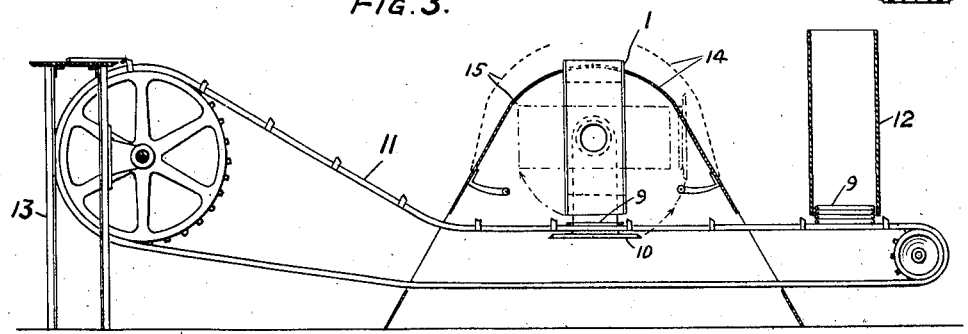
Fig. 4 is a longitudinal sectional view of Fig. 3.

The pallet is put on the open mold when the mold is in, or substantially in, the dotted line position of Fig. 4. The pallet raising device operates as follows. The pallet carriers 10, in low position, are under the ends of a pallet 9 that project beyond the conveyors 11 and in rising the pallet carrier lifts the pallet vertically, as shown in Fig. 2, where this lifting motion has started. The lifting motion is produced by a part of the cam grooves 27. By way of diagrammatic illustration the part shown at the right in Fig. 6 and the slotted portion of link 29 sliding on the shaft 16 accommodates this movement. Then the contour of the cam grooves in association with an end of the slots in the links 29 bends the joint at 10$^a$ turning the pallet carriers, now at high level, towards the right in Fig. 6 and putting the pallet in vertical position. The cam grooves draw and hold the pallet up to the oncoming mold with which and by the turning movement of the mold carrier, the pallet travels with the mold carrier back into horizontal position and is pushed by the brick back onto the conveyors 11, the grooves accommodating these movements.

By way of further description and referring to Fig. 6, the pallet carrier 10 is lifted, then turned counter-clockwise to meet the oncoming filled molds, then shifted toward the center of the trunnions 3, until the pallet is held up against the mold carrier, and then when the mold carrier completes its half turn the pallet carriers are dropped onto the conveyor 11.

Mounted above the machine there is a head 32 arranged to slide or roll on a track 33. The head 32 is provided with a motor 34 and suitable gearing 35 for turning the slicker 8 mounted on a shaft 36 revoluble in bearings 37 carried by the head 32. A cam 38 on the shaft 16 and the follower 39 and the link 40 serve to move the head 32 back and forth across the brick machine.

By providing clearance between the mold bottoms 7 and the frames 5, and supplying sand to the interior of the mold carrier 1, the sand during the revolution of the mold carrier escapes by way of the clearance and sands the molds.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A brick machine including in combination a generally rectangular hollow mold carrier having mold frames on opposite faces thereof, hollow trunnions by means of which the mold carrier is mounted for rotation about a horizontal axis, a plunger head arranged within the carrier and having mold bottoms for the frames, means for rotating the mold carrier with a dwell in its movement when in vertical position, pintles arranged in the hollow trunnion and connected with the plunger head, and cam mechanism operative on the pintles for preventing relative movement of the plunger head and carrier while rotating and for causing relative movement of these elements when held against rotation.

2. A brick machine including in combination a rotatable mold carrier, a pallet conveyor beneath the same, bearings in which the carrier is rotatable, pallet carriers having sliding and turning connection with the bearings, a drive shaft, and cam mechanism including followers slidable in respect to the drive shaft and pivotally connected with the pallet carriers whereby the pallet carriers are lifted from the conveyor and turned to meet the oncoming filled molds and held up to the carrier until it reaches vertical position and then dropped with the bricks onto the conveyor.

3. A brick machine including in combination a hollow mold carrier revoluble about a horizontal axis and having mold frames, a plunger head having mold bottoms with space provided between the rims thereof and the walls of the frames for the passage of sand adherent to the walls, and means for shifting the plunger head to project the mold bottoms into and out of the frames.

4. A brick machine including in combination mold frames, mold bottoms, means for affording the mold frame and bottoms relative motion, means for intermittently rotating the frames and bottoms as a unit, means for relatively shifting the frames and bottoms only at pauses in the rotating motion, a hood comprising two pivotally mounted sections adjacent said mold frame, and pallet mechanism for retaining bricks whilst the parts are in rotation.

ROY I. McCARTY.